Figure 1:
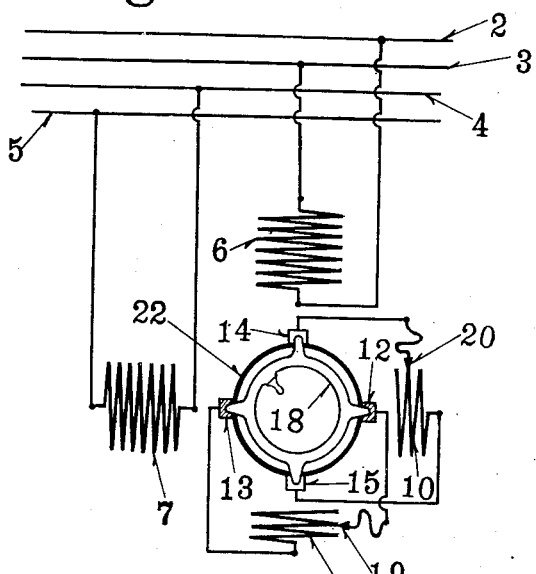

V. A. FYNN.
POLYPHASE MOTOR.
APPLICATION FILED FEB. 3, 1917.

1,304,957.

Patented May 27, 1919.
2 SHEETS—SHEET 1.

INVENTOR
Valère A. Fynn

BY
E. E. Huffman
ATTORNEY

V. A. FYNN.
POLYPHASE MOTOR.
APPLICATION FILED FEB. 3, 1917.

1,304,957.

Patented May 27, 1919.
2 SHEETS—SHEET 2.

INVENTOR
Valère A. Fynn

BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POLYPHASE MOTOR.

1,304,957.  Specification of Letters Patent.  Patented May 27, 1919.

Application filed February 3, 1917. Serial No. 146,367.

*To all whom it may concern:*

Be it known that I, VALÈRE A. FYNN, a subject of the King of England, residing at the city of St. Louis, State of Missouri, United States of America, have invented a certain new and useful Polyphase Motor, of which the following is such a full, clear, and exact description as will enable any one skilled in the art to which it appertains to make and use the same, reference being had to the accompanying drawings, forming part of this specification.

My invention relates to polyphase commutator motors having a shunt characteristic and in which at least part of the energy required in the induced member is conveyed to it by static induction.

One of my objects is to provide simple means whereby the speed of the machine can be adjusted over a wide range and any desired power factor secured for any of the speeds within the available range.

In carrying out my invention I close the induced member, which is provided with a commuted winding, along a plurality of axes by means of brushes, conductively impress alternating E. M. F.'s of constant phase and direction on the induced circuits, and change the speed of the motor by displacing the axes of the brushes and simultaneously changing the ratio between the rotor E. M. F.'s appearing at the brushes and the E. M. F.'s conductively impressed on said brushes. The phase of the conductively impressed E. M. F.'s is so chosen that when the brushes are in the position for which the motor speed is practically synchronous they are in quadrature with the rotor E. M. F.'s then appearing at the brushes. In case the rotor is closed along as many axes as there are inducing windings on the inducing member, as is usual, I obtain a practically synchronous speed by so locating the brushes as to cause the rotor axes to coincide with the stator axes, and conductively impressing on the rotor axes E. M. F.'s in phase quadrature with the rotor E. M. F.'s appearing along said axes. To change the speed of the motor, without altering the phase or the direction of the conductively impressed E. M. F.'s, it is then only necessary to displace the axes of the brushes in the one or in the other direction and to simultaneously change the ratio between the rotor E. M. F.'s appearing at the brushes and the E. M. F.'s conductively impressed on said brushes. I can change this ratio by changing either the magnitude of the conductively impressed E. M. F.'s or the magnitude of the effective rotor E. M. F.'s. By displacing the brush axes in one direction from the neutral or synchronous speed position, I obtain supersynchronous speeds: by displacing them in the opposite direction, I obtain subsynchronous speeds.

Figure 2:
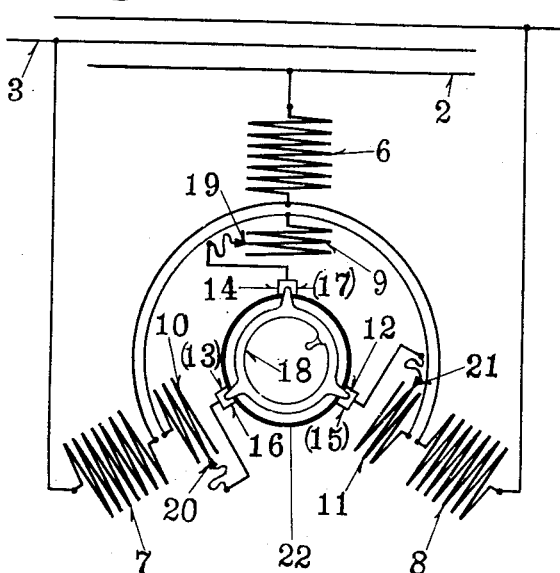
Figure 5:
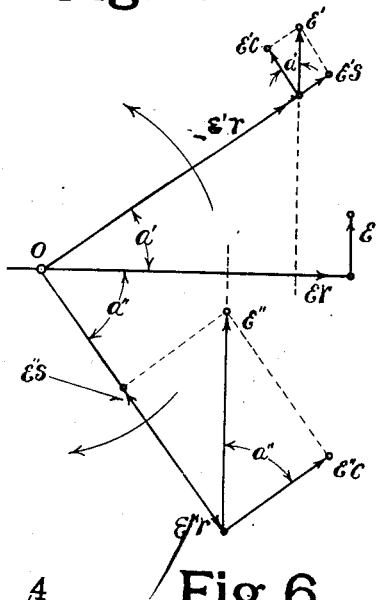
Figure 6:
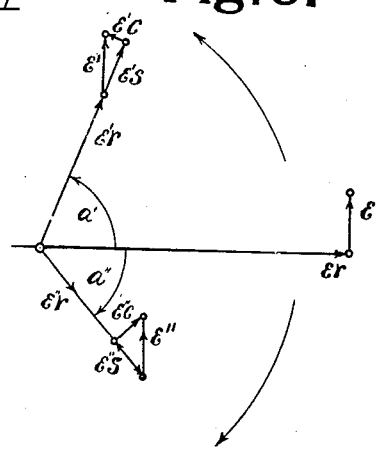
Figure 3:
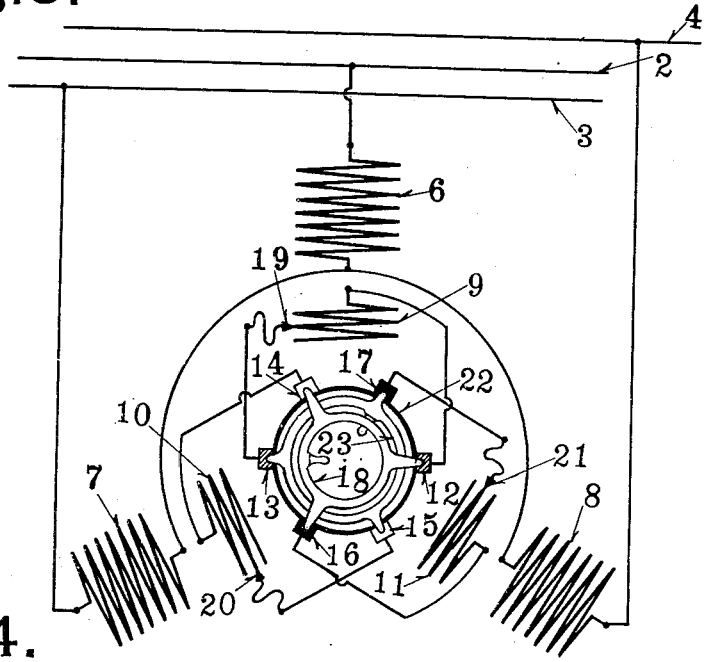
Figure 4:
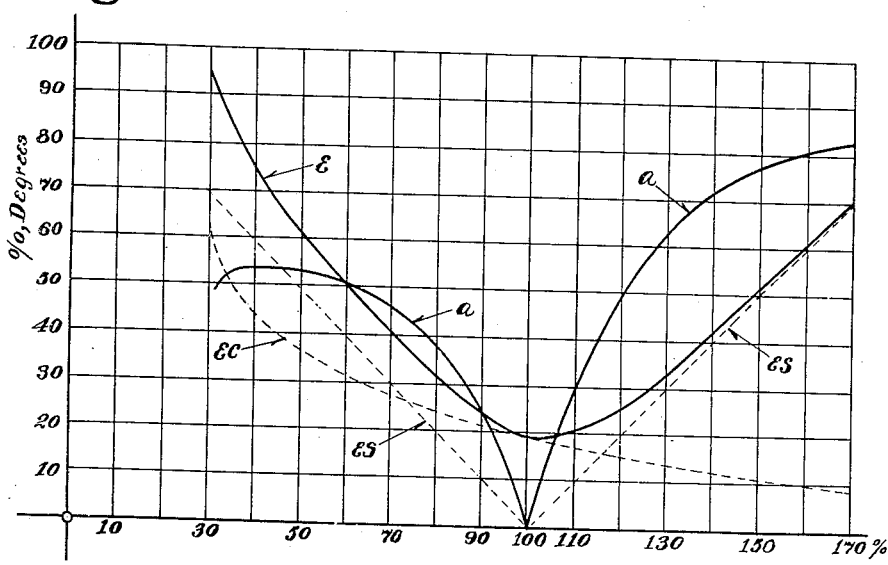

In the accompanying drawings, Figure 1 shows a two-pole two-phase motor, embodying my invention, the speed of which can be regulated by displacing the brush axes and changing the magnitude of the E. M. F.'s conductively impressed on the induced member. Fig. 2 shows a similar two-pole three-phase machine. Fig. 3 illustrates a two-pole three phase motor in which the speed can be changed by displacing the brush axes and changing the magnitude of the effective rotor E. M. F.'s. Figs. 4, 5 and 6 are explanatory diagrams.

Referring to Fig. 1, the stator, which in this case is the inducing member, carries two inducing windings, 6, 7, displaced by 90 degrees and connected to the mains 2, 3 and 4, 5, respectively. It also carries two regulating windings, 9, 10, the number of effective turns of which can be changed by means of the movable contacts 19, 20. The rotor, which in this case is the induced member, is provided with a commuted winding 22, a set of brushes 12, 13 in line with the inducing winding 7 and connected to the regulating winding 9 displaced by 90 electrical degrees from the axis in which these brushes are located, and another set of brushes 14, 15, located in the axis of the inducing winding 6 and connected to the regulating winding 10 located in the axis of the inducing winding 7. All the brushes are insulatingly supported by the brush carrier 18 provided with a suitable handle for simultaneously displacing them. The rotor E. M. F. appearing at the brushes 12, 13, or at the brushes 14, 15, is equal to the maximum E. M. F. statically induced in the rotor, because each pair of brushes is located on a diameter and the value of this E. M. F. does not change when the brushes are moved. In order to make the speed of this machine different from the synchronous, or nearly synchronous speed, at which it would run in the connection shown, I displace the brushes in one direction for the supersynchronous and in the opposite direction for the subsynchronous speed, while simultaneously altering the magnitude of the conductively impressed E. M. F.'s by moving the contacts 19 and 20.

In Fig. 2 the stator carries three inducing windings 6, 7, 8, displaced by 120 degrees and connected in star to the mains, 2, 3, 4. It also carries star connected regulating windings 9, 10, 11. The number of effective turns of each of the regulating windings can be changed by means of the movable contacts 19, 20 and 21. The rotor is provided with a commuted winding 22 and three brushes displaced by 120 degrees and insulatingly supported by the brush carrier 18 by means of which all of the brushes can be displaced in the one or the other direction. Each of the brushes is provided, in the drawing, with two numerals, for the purpose of enabling this figure to be more readily compared with Fig. 3. The brush 14, 17 and the brush 16, 13 are located in an axis which is perpendicular to the inducing winding 8. They are connected to the windings 9 and 10 respectively by means of the movable contacts 19, 20. The E. M. F. conductively impressed on them is the vectorial sum of the E. M. F.'s derived from 9 and 10 and is of the same phase as the E. M. F. generated in 11 or impressed on 8 when the magnitudes of the E. M. F.'s derived from 9 and 10 are equal. The brush 14, 17 and the brush 12, 15 are located along an axis which is at right angles to that of the inducing winding 7 and are connected to the regulating windings 9 and 11 respectively by means of the movable contacts 19 and 21. The E. M. F. conductively impressed on these brushes is of the same phase as that impressed on the inducing winding 7. The brush 16, 13, and the brush 12, 15 are located along an axis at right angles to that of the main inducing winding 6 and connected to the regulating windings 10 and 11 respectively by means of the contacts 20 and 21. The E. M. F. conductively impressed on these brushes is in phase with that impressed on the inducing winding 6. The rotor E. M. F. appearing at the brushes 14 and 16 is less than the maximum available rotor E. M. F. along that same axis, because the brushes in question are located on a chord, instead of on a diameter. The E. M. F. appearing at any other pair of brushes is smaller than the maximum available rotor E. M. F. for the same reason. When the brush carrier 18 is moved in the one or the other direction, the rotor E. M. F.'s appearing at the brushes do not change, but their axes are displaced. In the position of the brushes shown, the motor will run at a nearly synchronous speed and the E. M. F.'s conductively impressed on the several rotor circuits will act as phase compensating E. M. F.'s only, and will be in phase quadrature with the rotor E. M. F.'s appearing along the axes along which the external E. M. F.'s are impressed. In order to regulate the speed of this machine, I change the position of the brush axes by moving the brush carrier 18, and I simultaneously change the magnitude of the E. M. F.'s conductively impressed on said brushes.

In Fig. 3, the stator carries three inducing windings 6, 7, 8, displaced by 120 electrical degrees and connected in star to the mains 2, 3, 4. It also carries a regulating winding in each of the stator axes. These windings 9, 10, 11, are provided with movable contacts 19, 20, 21, by means of which the effective number of turns of said windings can be changed. The rotor carries a commuted winding 22, and three sets of brushes coöperating therewith. The brushes, 12, 13, are located in an axis displaced by 90 electrical degrees from the axis of the inducing winding 6 and are connected to the regulating winding located in that axis. The brushes 14, 15 are connected to the regulating winding 10 located in the axis of the inducing winding 7 and are displaced from this axis by 90 degrees. The brushes 16, 17 are connected to the regulating winding 11 located in the axis of the inducing winding 8 and are placed along an axis in space quadrature with that of 8. In the position of the brushes shown, the machine will run at a nearly synchronous speed, and the E. M. F.'s conductively impressed on the several brush circuits are in phase quadrature with the rotor E. M. F.'s appearing at the corresponding brushes. The brushes 12, 14 and 16 are insulatingly supported by the brush carrier 18, and the brushes 13, 15, 17 are similarly supported by the brush carrier 23. Each of these brush carriers can be displaced independently of the other. In order to regulate the speed of this machine, I can either displace all the brush axes without changing the relative position of the brushes and simultaneously change the magnitude of the E. M. F.'s conductively impressed on the rotor, or I can leave the magnitude of the conductively impressed E. M. F.'s constant and simultaneously change the axes of the brushes and also the peripheral distance between coöperating brushes, that is, the peripheral distance between the brushes 16, 17, also that between brushes 14, 15, and between the brushes 13, 12. I can also change the speed of this machine by displacing the brush axes, changing the peripheral distance between coöperating brushes, and changing the magnitude of the conductively impressed E. M.

F.'s. In order to secure supersynchronous speeds, I displace the axes of all the brush sets in one direction from the position in which approximately synchronous speed is obtained; in order to secure subsynchronous speeds, I displace the axes of all the brushes in the opposite direction.

The axes of all the brush sets can be displaced, or the peripheral distance between brushes belonging to the same set can be changed, by moving one or both of the brush carriers, 18, 23. But if the peripheral distance between coöperating brushes is to be changed without changing the axis of these brushes, then it is necessary to move both brush carriers.

In more fully explaining the operation of the motor shown in Fig. 1, reference will be had to Figs. 4 and 5. For a given machine of this kind, it is always possible to closely predetermine by calculation or exactly ascertain by experiment the magnitude of the compensating E. M. F. which it is necessary to inject into the rotor for every speed in order to obtain a desired value of power factor. A convenient way of expressing the magnitude of this compensating E. M. F. is to give it in per cent. of the maximum available rotor E. M. F., or that appearing across a pole pitch of the rotor. In a two-pole motor the rotor pole pitch is equal to the rotor diameter. In Fig. 4, the curve $e_c$ is supposed to represent the compensating E. M. F. in per cent. of the maximum rotor E. M. F. $e_r$ which is required at the different speeds within the range of 30 to 170 per cent. of the synchronous in order to cause the machine to operate with unity power factor. It will be understood that this curve will not be the same for every machine, but it will, as a rule, have some such shape as that shown in Fig. 4. The actual values of the compensating E. M. F.'s, expressed in per cent. of the maximum available rotor E. M. F., will, as a rule, decrease with increasing size of machine and in some cases it may even be necessary to reverse the direction of this compensating E. M. F. at the higher speeds. In other words, the curve $e_c$ of Fig. 4 may at times cut the horizontal zero line at supersynchronous speeds. But whatever the exact shape of this curve, it is always known or ascertainable. It is also always known what value it is necessary to give to the speed regulating E. M. F.'s $e_s$ to be injected into the rotor circuits in order to secure a given speed differing from the synchronous. The value of $e_s$ is determined by the simple relation $$\frac{e_r \pm e_s}{e_r} = s$$

where $s=1$, corresponds to the synchronous speed, and where the plus sign is used for the supersynchronous, and the minus sign for the subsynchronous, speeds. The values of $e_s$ in per cent. of $e_r$ for the machine being considered, are shown in Fig. 4, for all values between 30 and 170 per cent. of the synchronous speed and are represented by the straight dotted lines marked $e_s$.

With the brushes 12, 13, 14, 15 in the position shown in Fig. 1, the rotor E. M. F. $e_r$ appearing at any one set of these brushes, is correctly represented by the horizontal vector $e_r$ in Fig. 5, and the E. M. F. conductively impressed on these same brushes is correctly represented by the vertical vector $e$. The connections and the brush position in Fig. 1 are such that E. M. F.'s, conductively impressed on the rotor affect the power factor of the machine only. In order to secure unity power factor, it is only necessary to give to these E. M. F.'s the magnitude prescribed by the curve $e_c$ of Fig. 4 for 100% of the synchronous speed.

If the brushes be now moved out of the position shown in Fig. 1, in the one or the other direction, for instance, counter-clockwise through an angle $a'$ while the brushes remain connected to the regulating windings 9, 10, then the phase of the rotor E. M. F. appearing at any set of brushes, for instance at the brushes 12, 13, will change, but its magnitude will remain the same. The change in phase will be exactly proportional to the angular brush displacement and is correctly represented in Fig. 5 by the vector $e'_r$ differing from the vector $e_r$ of that same figure in phase only. The movement of the brushes will not affect the phase of the conductively impressed E. M. F.'s, so that, for the new position of brushes, $e'$ and $e'_r$ will not be in phase quadrature, and the conductively impressed E. M. F. can now be decomposed into one component $e'_s$ in phase with $e'_r$, and another component $e'_c$ in phase quadrature with $e'_r$. The first will affect only the speed of the motor; the second will affect only its power factor. If the ratio of the rotor E. M. F. appearing at certain brushes to the E. M. F. conductively impressed on these brushes is not changed, then a movement of the brush axes will change the speed of the motor but will also change its power factor, and it is not possible, by simply displacing the brushes of such a machine, to obtain the same power factor at all speeds or to secure any desired power factor at any speed, but one is forced to accept the power factor which results from the brush displacement, and which for most speeds is of a magnitude which is not useful in practice.

Now I have discovered that by displacing the brush axes through an angle which will make the ratio of the speed regulating to the phase compensating components of the conductively impressed E. M. F.'s equal to the ratio of the speed regulating to the phase compensating E. M. F. necessary to secure the desired power factor at the speed required, and by so changing the ratio of the conductively impressed E. M. F.'s to the effective rotor E. M. F.'s as to secure the ratio of the speed regulating component to the effective rotor E. M. F. corresponding to the required speed, I can operate such a motor throughout a wide range of speeds at predetermined power factor values. By "effective rotor E. M. F." I mean that appearing at a set of brushes coöperating with the rotor winding. This effective E. M. F. may or may not be equal to the maximum available rotor E. M. F. If the brushes in a two-pole motor are displaced by half the rotor circumference, then the effective E. M. F. will be equal to the maximum E. M. F. But if their displacement is smaller, then the effective E. M. F. will be smaller than the maximum available.

In order to make this method of speed and power factor regulation more clear in connection with Figs. 1 and 4, that is, for the case in which the magnitude of $e_r$ remains constant, I will explain my method in connection with the phase diagram of Fig. 5.

The curves $e_c$ and $e_s$ of Fig. 4 can be assumed to be known for every machine. The curve $e_c$ is determined by the constants of the machine and the choice of the operator. He may, for instance, elect to operate the machine at unity power factor throughout the speed range. The values of $e_s$ are readily ascertained by means of the formula already given. If $e_r$ is to remain constant, then the magnitude of $e$ must be changed as the brushes are displaced. The angle through which the brushes must be displaced, can be ascertained from the equation, $$e_s = e \times \sin a$$

or $$e_c = e \times \cos a$$

and the magnitude of the conductively impressed E. M. F. is determined by the equation $$e = \sqrt{e_s^2 + e_c^2}$$

Thus, if I displace all the brushes of Fig. 1 through an angle $a'$ of 34.4° in a direction to secure supersynchronous speed, and if I make the magnitude $e'$ of the conductively impressed E. M. F.'s equal to 30.3% of $e_r$ instead of 28% thereof as at synchronous speed, then the motor will run at 112% of the synchronous speed, with unity power factor. The ratio of $e'$ to $e'_r$ will be found to be exactly that shown in Fig. 4 for the speed in question, and no other brush displacement and no other magnitude of conductively impressed E. M. F.'s will achieve the same result. Similarly, if I displace the brushes in the opposite direction through an angle $a''$ equal to 53.5° degrees, and I make the magnitude of the conductively impressed E. M. F.'s equal to $e''$ of Fig. 5, or to 99.4% of $e_r$, the motor will operate at 44% of the synchronous speed, exactly under the condition shown in Fig. 4. In this case, the speed regulating component $e''_s$ of $e''$ opposes $e''_r$, and thus reduces the resultant working E. M. F. in the rotor axes, and consequently the speed of the machine. The component $e''_c$ is seen to be still in the correct phase relation to $e''_r$ to secure phase compensation.

The motor shown in Fig. 2 operates in exactly the same manner and can be regulated as explained in connection with Fig. 1.

The machine shown in Fig. 3 can be operated as explained in connection with Fig. 1, or its speed can be changed and its power factor adjusted by displacing the brushes and simultaneously varying the ratio between the conductively impressed and the rotor E. M. F.'s, not by varying the magnitude of the conductively impressed E. M. F.'s but by varying the magnitude of the rotor E. M. F.'s. In this case, not only the phase but also the magnitude of the conductively impressed E. M. F.'s will remain constant throughout.

Again assuming that the curve $e_c$ of Fig. 4 is known for the machine to be regulated, then the equation $$e_c = e \times \cos a$$

at once gives the value of the brush displacement, since $e_c$ and $e$ are known while the corresponding value of $e_s$, if not already known, can be found from the equation $$e_s = e \times \sin a$$

Knowing $e_s$ and the percentage of synchronous speed to be obtained, the value of $e_r$ is found from the equation $$e_r (s-1) = e_s$$

In order to secure this speed, and the power factor settled upon, it is now only necessary to displace the axes of the brushes by the angle found, and to so alter their peripheral distance as to reduce $e_r$ to the value determined by the last equation.

If the machine is to be operated in accordance with Fig. 4, then the horizontal vector $e_r$ in Fig. 6, and the vertical vector $e$ correctly represent the conditions illustrated in Fig. 3, for which the machine will operate very near synchronism at unity power factor. Should it for instance be desired to raise the speed to 135% of the synchronous, then the brush axes should be displaced by an angle $a'$ equal to 68.8 degrees, and their peripheral distance so reduced as to reduce $e'_r$ to 52.1% of $e_r$, in which case the ratio of $e'_s$ to $e'_r$ will be such as to give the desired speed, and $e'_c$ will have the value necessary to give unity power factor at that speed. No other angular brush displacement and no other value of $e'_r$ will give the same results if the magnitude of the conductively impressed E. M. F.'s is not changed.

Similarly, a displacement of the brush axes through an angle $a''$ equal to 49.3 degrees in the opposite direction, and a reduction of $e_r$ to $e''_r$, which is 42.5% of $e_r$, will reduce the speed to 65% of the synchronous while still maintaining the power factor at unity.

In order to find the correct angular displacement of the brush axes and the correct ratio of the conductively impressed E. M. F.'s to the effective rotor E. M. F.'s, one may proceed as follows: Curves $e_c$ and $e_s$ of Fig. 4 are always obtainable for any machine. It is therefore only necessary to pick out the values of $e_s$ and $e_c$ for the speed desired, when the equation $$\tan a = \frac{e_s}{e_c}$$

will at once give the angle through which the brush axes are to be displaced. The equation $$e = \sqrt{e_s^2 + e_c^2}$$

then gives the value of the conductively impressed E. M. F.'s for the maximum rotor E. M. F.'s corresponding to the maximum distance between coöperating brushes, and therefore makes known the correct ratio of $e$ to $e_r$. If $e_r$ is to be kept constant, then $e$ must be given the value shown by this equation. If $e$ is to be kept constant, then $e_r$ is to be so changed, by changing the peripheral distance between coöperating brushes, as to make the ratio of $e$ to $e_r$ equal to that determined by the value of $e$ found for the maximum value of $e_r$ from the last equation.

It will be readily understood that the conductively impressed E. M. F.'s need not necessarily be derived from independent windings located on the inducing member. They can be taken from the inducing windings themselves or from external transformers, the primaries of which are connected to the supply in a manner well understood.

Having fully described my invention, what I claim as new and desire to secure by Letters Patent of the United States is:

1. In a polyphase alternating current motor, the combination of an inducing member, an induced member provided with a commuted winding and a polyphase arrangement of brushes coöperating therewith, means for conductively impressing on the brushes E. M. F.'s. whose magnitude is independent of the load and whose phase differs from the phase of the induced E. M. F.'s. appearing at the brushes, means for changing the axes of the brushes, and means for changing the ratio between the magnitude of the induced E. M. F. appearing at the brushes and the magnitude of the E. M. F. conductively supplied thereto.

2. In a polyphase alternating current motor, the combination of an inducing member, an induced member provided with a commuted winding and a polyphase arrangement of brushes coöperating therewith, means for conductively impressing on the brushes E. M. F.'s. whose magnitude is independent of the load and whose phase differs by substantially 90 degrees from the phase of the induced E. M. F.'s. appearing at the brushes, means for changing the axes of the brushes, and means for changing the ratio between the magnitude of the rotor E. M. F. appearing at the brushes and the magnitude of the co-phasal component of the E. M. F. conductively supplied thereto.

3. In a polyphase alternating current motor, the combination of an inducing member, an induced member provided with a commuted winding and a polyphase arrangement of brushes coöperating therewith, means for changing the axes of said brushes, and means for conductively impressing on the brushes E. M. F.'s whose magnitude is independent of the load and whose phase differs from the phase of the induced E. M. F.'s appearing at said brushes and of such magnitude as to eliminate all lagging magnetizing currents in the inducing member.

4. The method of regulating a polyphase alternating current motor having an inducing member provided with a plurality of axially displaced inducing windings, an induced member provided with a commuted winding and a set of brushes in each inducing axis of the inducing member, and means for conductively impressing on each set of brushes an E. M. F. whose magnitude is independent of the load and whose phase differs from the phase of the induced E. M. F. appearing at said brushes, which comprises moving the brushes in one direction from the inducing axes of the inducing member to obtain supersynchronous speeds and moving said brushes in the opposite direction from said axes to obtain subsynchronous speeds.

5. The method of adjusting the speed of a polyphase induction motor having its induced member provided with a commuted winding closed along a plurality of axes by means of brushes, and means for conductively supplying E. M. F.'s to said brushes differing in phase from the induced E. M. F.'s appearing at the brushes, which consists in moving the brushes to such position that the ratio of the speed regulating to the phase compensating component of the conductively supplied E. M. F. is such as to cause the desired power factor to exist when the desired speed is obtained, and adjusting the ratio of the magnitude of the supplied E. M. F. to the effective rotor E. M. F. appearing at the brushes to produce such desired speed.

6. The method of adjusting the speed of a polyphase induction motor having its induced member provided with a commuted winding closed along a plurality of axes by means of brushes, and means for conductively supplying E. M. F.'s to said brushes differing in phase from the induced E. M. F.'s appearing at the brushes, which consists in moving the brushes to such position that the ratio of the speed regulating to the phase compensating component of the conductively supplied E. M. F. is such as to cause approximately unity power factor to exist when the desired speed is obtained, and adjusting the ratio of the magnitude of the supplied E. M. F. to the effective rotor E. M. F. appearing at the brushes to produce such desired speed.

In testimony whereof, I have hereunto set my hand and affixed my seal.

VALÈRE A. FYNN. [L. S.]